US009158782B2

(12) United States Patent
Nucci et al.

(10) Patent No.: US 9,158,782 B2
(45) Date of Patent: ＊Oct. 13, 2015

(54) CLOUD BASED MASTER DATA MANAGEMENT SYSTEM WITH CONFIGURATION ADVISOR AND METHOD THEREFORE

(75) Inventors: Richard C. Nucci, Wynnewood, PA (US); James T. Ahlborn, Downington, PA (US); Mitchell J. Stewart, Malvern, PA (US); Nikola A. Kolev, Berwyn, PA (US)

(73) Assignee: Dell Products, LP, Round Rock, TX (US)

( * ) Notice: Subject to any disclaimer, the term of this patent is extended or adjusted under 35 U.S.C. 154(b) by 508 days.

This patent is subject to a terminal disclaimer.

(21) Appl. No.: 13/459,972

(22) Filed: Apr. 30, 2012

(65) Prior Publication Data

US 2013/0290690 A1 Oct. 31, 2013

(51) Int. Cl.
*G06F 15/173* (2006.01)
*G06F 17/00* (2006.01)
*G06F 17/30* (2006.01)
*H04L 12/24* (2006.01)

(52) U.S. Cl.
CPC .... *G06F 17/30126* (2013.01); *G06F 17/30566* (2013.01); *H04L 41/0843* (2013.01); *H04L 41/0883* (2013.01); *H04L 41/5064* (2013.01)

(58) Field of Classification Search
CPC ..................... H04L 29/08153; H04L 41/0843; H04L 41/0883; G06F 17/30126; G06F 17/30566; G06F 21/6218; G06F 3/0631
USPC .................................................. 709/224, 225
See application file for complete search history.

(56) References Cited

U.S. PATENT DOCUMENTS

| | | | |
|---|---|---|---|
| 5,410,675 A | | 4/1995 | Shreve et al. |
| 5,794,246 A | * | 8/1998 | Sankaran et al. ..................... 1/1 |
| 5,917,730 A | | 6/1999 | Rittie et al. |
| 5,953,533 A | | 9/1999 | Fink et al. |

(Continued)

FOREIGN PATENT DOCUMENTS

| | | |
|---|---|---|
| WO | WO 02/102097 A1 | 12/2002 |
| WO | WO 2008/134627 A2 | 11/2008 |

OTHER PUBLICATIONS

"The Quest for a Cloud Integration Strategy," Boomi Whitepaper, 2011, http://marketing.boomi.com/QuestForCloudIntegration.html.

(Continued)

*Primary Examiner* — Joe Chacko
(74) *Attorney, Agent, or Firm* — Larson Newman, LLP

(57) ABSTRACT

A system includes a data store, a data registry, an interface process module, a suggestion database, and a configuration module. The data registry establishes storage of a data record at the data store and maintains links identifying relationships between the data record and a source record at a first source enterprise and between the data record and a source record at a second source enterprise. The interface process module determines that a value at the data record has been updated, and provides the updated value to a corresponding source enterprise using an Internet protocol. The suggestion database includes configuration information associated with multiple users of the system. The configuration module provides Internet access to facilitate configuration of the system by a user and to provide configuration guidance to the user based on the configuration information.

20 Claims, 9 Drawing Sheets

(56) References Cited

U.S. PATENT DOCUMENTS

| | | | |
|---|---|---|---|
| 6,014,670 A | | 1/2000 | Zamanian et al. |
| 6,032,158 A * | | 2/2000 | Mukhopadhyay et al. ............ 1/1 |
| 6,038,590 A | | 3/2000 | Gish |
| 6,044,374 A | | 3/2000 | Nesamoney et al. |
| 6,106,569 A | | 8/2000 | Bohrer et al. |
| 6,115,690 A | | 9/2000 | Wong |
| 6,134,706 A | | 10/2000 | Carey et al. |
| 6,208,990 B1 | | 3/2001 | Suresh et al. |
| 6,223,180 B1 | | 4/2001 | Moore et al. |
| 6,339,775 B1 | | 1/2002 | Zamanian et al. |
| 6,343,275 B1 | | 1/2002 | Wong |
| 6,418,400 B1 | | 7/2002 | Webber |
| 6,626,957 B1 | | 9/2003 | Lippert et al. |
| 6,640,226 B1 | | 10/2003 | Shringeri et al. |
| 6,789,096 B2 | | 9/2004 | Sankaran et al. |
| 6,820,077 B2 | | 11/2004 | Godfredsen et al. |
| 6,820,135 B1 | | 11/2004 | Dingman et al. |
| 6,823,373 B1 | | 11/2004 | Pancha et al. |
| 6,850,947 B1 | | 2/2005 | Lim et al. |
| 6,854,107 B2 | | 2/2005 | Green et al. |
| 6,895,409 B2 | | 5/2005 | Uluakar et al. |
| 6,895,471 B1 | | 5/2005 | Tse et al. |
| 6,922,831 B1 | | 7/2005 | Kroening et al. |
| 6,988,165 B2 | | 1/2006 | White et al. |
| 6,993,743 B2 | | 1/2006 | Crupi et al. |
| 6,996,584 B2 | | 2/2006 | White et al. |
| 7,162,643 B1 | | 1/2007 | Sankaran et al. |
| 7,171,647 B1 | | 1/2007 | Smith et al. |
| 7,181,457 B2 | | 2/2007 | Reinauer et al. |
| 7,496,888 B2 | | 2/2009 | Sanjar et al. |
| 7,499,951 B2 | | 3/2009 | Mueller et al. |
| 7,590,724 B1 | | 9/2009 | Williams |
| 7,610,575 B2 | | 10/2009 | Sproule |
| 7,792,784 B2 | | 9/2010 | Gupta |
| 7,941,784 B2 | | 5/2011 | Shenfield et al. |
| 8,036,939 B2 | | 10/2011 | Gil et al. |
| 8,060,396 B1 | | 11/2011 | Bessler et al. |
| 8,095,416 B2 | | 1/2012 | Harvey et al. |
| 8,126,762 B2 | | 2/2012 | Ramachandran et al. |
| 8,165,993 B2 | | 4/2012 | Broda et al. |
| 8,271,615 B2 | | 9/2012 | Ellison et al. |
| 8,276,115 B2 | | 9/2012 | Bates et al. |
| 2001/0052112 A1 | | 12/2001 | Mohan et al. |
| 2002/0016771 A1 | | 2/2002 | Carothers et al. |
| 2002/0073396 A1 | | 6/2002 | Crupi et al. |
| 2002/0095650 A1 | | 7/2002 | Green et al. |
| 2002/0104067 A1 | | 8/2002 | Green et al. |
| 2003/0221184 A1 | | 11/2003 | Gunjal et al. |
| 2003/0236677 A1 | | 12/2003 | Casati et al. |
| 2004/0044689 A1 * | | 3/2004 | Krabel et al. .............. 707/104.1 |
| 2004/0068431 A1 | | 4/2004 | Smith et al. |
| 2004/0133876 A1 | | 7/2004 | Sproule |
| 2005/0005262 A1 | | 1/2005 | Mohan et al. |
| 2005/0198618 A1 | | 9/2005 | Lalonde et al. |
| 2005/0273758 A1 | | 12/2005 | Long |
| 2006/0161495 A1 | | 7/2006 | Wigzell |
| 2006/0184933 A1 | | 8/2006 | Chessell et al. |
| 2007/0168206 A1 | | 7/2007 | McCall et al. |
| 2008/0163164 A1 | | 7/2008 | Chowdhary et al. |
| 2008/0196006 A1 | | 8/2008 | Bates et al. |
| 2008/0209078 A1 | | 8/2008 | Bates et al. |
| 2008/0243884 A1 | | 10/2008 | Mehta |
| 2008/0270977 A1 | | 10/2008 | Nucci et al. |
| 2008/0306973 A1 * | | 12/2008 | Richard ........................ 707/100 |
| 2009/0112666 A1 | | 4/2009 | Guo et al. |
| 2009/0171758 A1 | | 7/2009 | Alfandary et al. |
| 2009/0228428 A1 | | 9/2009 | Dan et al. |
| 2010/0023362 A1 | | 1/2010 | Nguyen et al. |
| 2010/0042641 A1 | | 2/2010 | Kamalakantha et al. |
| 2010/0070317 A1 | | 3/2010 | Pachter et al. |
| 2010/0070556 A1 | | 3/2010 | Heusermann et al. |
| 2010/0070981 A1 | | 3/2010 | Hadar |
| 2010/0138257 A1 | | 6/2010 | Wocher et al. |
| 2010/0169148 A1 | | 7/2010 | Oberhofer et al. |
| 2010/0185510 A1 | | 7/2010 | Maier et al. |
| 2010/0306709 A1 | | 12/2010 | Lynch et al. |
| 2010/0332510 A1 | | 12/2010 | Gitai et al. |
| 2010/0332535 A1 | | 12/2010 | Weizman et al. |
| 2011/0029575 A1 | | 2/2011 | Sagi et al. |
| 2011/0078607 A1 | | 3/2011 | Ryan et al. |
| 2011/0282715 A1 | | 11/2011 | Nguyen et al. |
| 2012/0041945 A1 | | 2/2012 | Blubaugh |
| 2013/0238641 A1 | | 9/2013 | Mandelstein et al. |
| 2013/0275369 A1 | | 10/2013 | Hajare et al. |

OTHER PUBLICATIONS

Boomi Integration Platform datasheet Boomi, Inc., 2006.
Boomi On Demand product data sheet Boomi, Inc., 2007.
Boomi AS2 Transport datasheet Boomi, Inc., 2006.
Boomi, Inc., Announces General Availability of the Boomi Integration Platform V3.0, PR Newswire, Jan. 16, 2004.
Dell Agrees to Acquire Software Firm Boomi Wall Street Journal, Nov. 3, 2010.
Silk, Scott, Automating the Balanced Scorecard Management Accounting, vol. 19, No. 11, May 1998.
Arnold, Tom, Dashboard & Scorecard Software Tools for Operations Management and Strategy Deployment Summit Media Partners, Sep. 18, 2002.
Norton, David, SAP Strategic Enterprise Management: Translating Strategy Into Action: The Balanced Scorecard SAP, May 1999.
TIBCO Staffware Process Suite product brochure TIBCO Software Inc., 2006.
Chambers, Bill et al., Real-Time Data Access Using Business Process Management VARBusiness, vol. 19, No. 23, Nov. 10, 2003.
Sturim, Robert, Achieving Competitive Advantage Through Supply Chain Integration Vitria Technology Inc., 1999.
Intalio Adds Celequest BAM Technology to Its BPMS Solution; Celequest Management Dashboards Integrated into Intalio/BPMS, Business Wire, Jan. 17, 2006.
Viane, Stijn et al., Corporate Performance Management: Beyond Dashboards and Scorecards Journal of Performance Management, vol. 20, No. 1, 2007.
Ergometrics.com web pages Ergometrics, Mar. 2000, Retrieved from Archive.org Jan. 25, 2007.
iDashes.net web pages iDashes, Inc., May 2001, Retrieved from Archive.org Jan. 25, 2007.
Performance Dashboards: Measuring, Monitoring, and Managing Your Business: Education and Research The Data Warehouse Institute, PowerPoint presentation, 2006.
Eckerson, Wayne E., Performance Dashboards: Measuring, Monitoring, and Managing Your Business: John Wiley & Sons, ISBN 13-978-0-471-724179-9, 2006.

* cited by examiner

CLOUD BASED MASTER DATA MANAGEMENT SYSTEM WITH CONFIGURATION ADVISOR AND METHOD THEREFORE

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is contained in co-pending U.S. patent application Ser. No. 13/459,947, entitled "Cloud Based Master Data Management System and Method Therefor," filed of even date herewith, the disclosure of which is hereby incorporated by reference.

Related subject matter is contained in co-pending U.S. patent application Ser. No. 13/945,955 entitled "Cloud Based Master Data Management System with Remote Data Store and Method Therefor," filed of even date herewith, the disclosure of which is hereby incorporated by reference.

FIELD OF THE DISCLOSURE

This disclosure generally relates to information handling systems, and more particularly relates to automating mapping of variables between business process applications.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
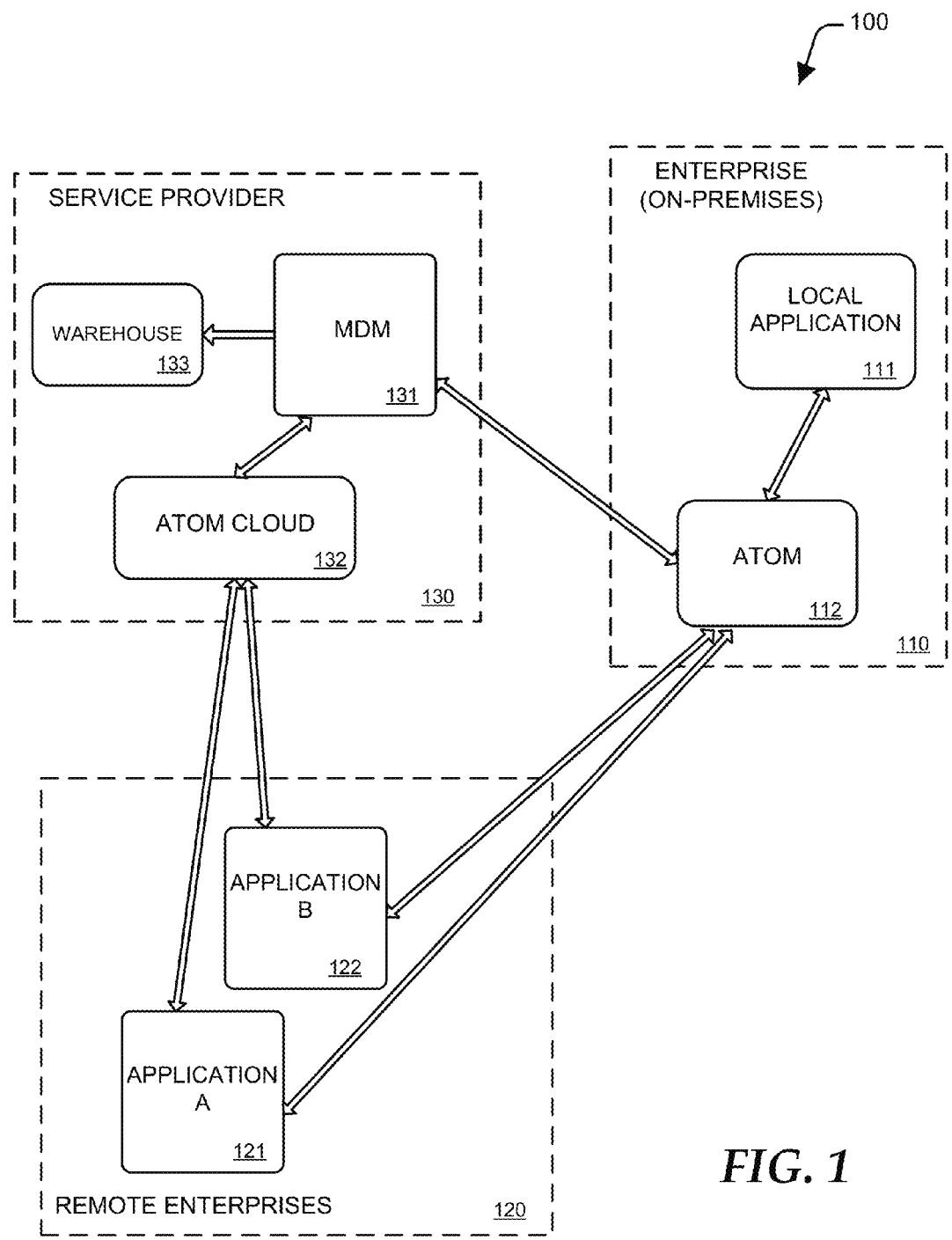
FIG. 1 is a block diagram illustrating a distributed business system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, etc. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier or enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

An enterprise, such as a business, can maintain information handling systems and associated software applications and information storage devices that are located on-premise. In addition, an enterprise can utilize equipment, application software, or other services that are located off-premise, accessible via a communications network. For example, an enterprise may outsource various aspects of their business, such as customer relationship management (CRM), enterprise resource planning (ERP), and the like to an external vendor. Regardless of whether or not portions of a business process are distributed off-premise, an enterprise typically maintains multiple information databases that must be kept consistent. For example, if customer information included at a sales invoice application is updated, corresponding information included at a product shipping application should be similarly updated. The process for maintaining consistency between two or more information sources is known as master data management (MDM). MDM generally provides processes for collecting, aggregating, matching, consolidating, quality-assuring, persisting and distributing information throughout an organization to ensure consistency and control in the ongoing maintenance and application use of the information. Information managed by an MDM system can include customer, product, vendor, employee, and similar information. Techniques described herein enable users to conduct all setup, configuration and management of MDM services using an Internet Web browser. The disclosed MDM system is multi-tenant, providing data management services to multiple clients concurrently at a single MDM instance.

FIG. 1 shows a distributed business system 100 that includes both on-premises and off-premises resources according to a specific embodiment of the present disclosure. The system 100 includes an enterprise 110, remote enterprises 120, and a service provider 130. The enterprise 110 includes a local application 111 and an Atom 112. The enterprise 110 can be a business, an organization, or another type of enterprise. For simplicity, the following discussion will assume that the enterprise 110 is a business and that the remote enterprises 120 and the service provider 130 represent other businesses that provide business services to the enterprise 110. The Atom 112 is an interface process module for communicating with entities outside the premises of the enterprise 110. For example, the Atom 112 can include a software program that can be executed at an information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The Atom 112 is configured to communicate with the remote enterprises 120, the with service provider 130, and with other enterprises, applications, databases (not shown at FIG. 1), and the like. The Atom 112 can communicate with the remote enterprises 120 and the service provider 130 via the Internet or by using another communications medium. The local application 111 is another software application used to conduct one or more aspects of the business, such as a sales or marketing application program. The enterprise 110 may utilize other local applications, not shown in FIG. 1. Individual enterprises are assumed to be located remotely from one another, unless explicitly specified otherwise. As used herein, the term remote refers to a distinct geographical location.

The remote enterprises 120 can represent one or more business organizations. These organizations may be affiliated with the enterprise 110 or they may represent other businesses. The remote enterprises 120 include two applications, an Application A 121, and an Application B 122. For example, the Application A 122 can represent a CRM service and the Application B 122 can represent an ERP service that the enterprise 110 has commissioned to perform the respective services. In other words, the enterprise 110 may represent a business that has out-sourced CRM and ERP services to the remote enterprises 120. The service provider 130 includes an MDM system 131, an Atom Cloud 132, and a warehouse 133. The MDM system 131 provides master data management services to the enterprise 110, as well as to other enterprises that are unrelated to the enterprise 110 (not shown at FIG. 1). Accordingly, the MDM system 131 can be referred to as multi-tenant, for example providing data management services to multiple business clients concurrently. The Atom Cloud 132 includes multiple individual Atoms. Each Atom of the Atom Cloud 132 represents individual business processes associated with a respective client and associated with a respective remote application, such as one of the remote applications 120. The warehouse 133 provides archive storage. For example, the warehouse 133 can provide data backup services and can store outdated information. In an embodiment, a client such as the enterprise 110 can access information stored at the warehouse 133. Furthermore, the service provider 130 can provide analytical services to clients based on archived data stored at the warehouse 133.

During operation, the Atom 112 and the Atom Cloud 132 monitor the local application 111, the remote application 121, and the remote application 122 to determine if a value of a source record stored therein has changed. If an Atom associated with an application determines that a source record has been updated, the Atom provides the updated information to the MDM system 131. In response to receiving the change notification, the MDM system 131 can update a golden record maintained by the MDM system 131. The Atom 112 and individual Atoms at the Atom Cloud 132 also monitor the MDM system 131 to identify if a value at a golden record maintained at the MDM system 131 has changed. If an Atom determines that a value at a golden record at the MDM system 131 has changed, the Atom can initiate actions to update corresponding source records at the other applications, as applicable. For example, if a phone number associated with a customer is updated at Application A 121, a process at the Atom Cloud 132 can determine that the change has occurred and provide the change to the MDM system 131. In response, the MDM system 131 can update a golden record associated with the customer information. The Atom 112 or the Atom Cloud 132, having detected the update at the MDM system 131, can forward the revised phone number to the Application B 122 and to the Local Application 111.

As used herein, a record can include a single string or a single numerical value; however a record typically includes a collection of fields and each field, also referred to as an attribute, can be associated with a respective value. For example, a record can include a collection of information associated with a product, such as a product name, a product model number, product specifications, product inventory, and the like. In an embodiment, a format of a record or a collection of records can comply with a standard or proprietary syntax such as the Extensible Markup Language (XML), a comma-separated list, an encrypted or unencrypted encoding scheme, or another format.

Figure 2:
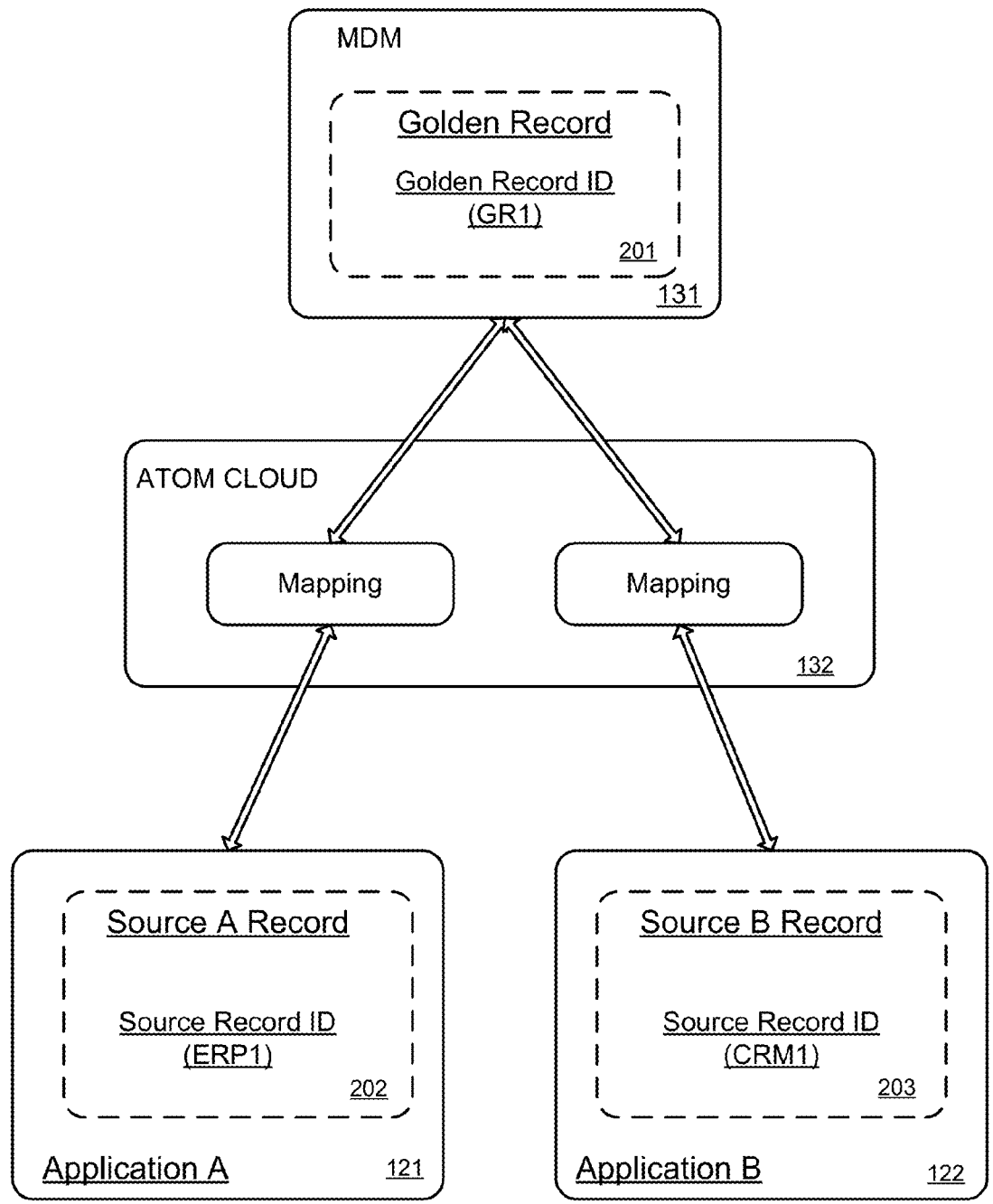
FIG. 2 is a block diagram illustrating operation of a Master Data Management (MDM) system according to an embodiment of the present disclosure.

FIG. 2 shows the operation of the MDM system 131 of FIG. 1 in accordance with an embodiment of the present disclosure. The MDM system 131 can include a large number of golden records including a golden record 201. The golden record 201 is identified by a golden record identifier GR1. The MDM system 131 maintains a link between the golden record identifier and a corresponding source record identifier at each applicable application. For example, the golden record 201 may correspond to a collection of information associated with a particular customer and may include a phone number associated with the customer. The Application A 121 can maintain a source record 202 that includes information about the customer, also including the customer's phone number. The source record 202 is identified by a source record identifier ERP1. Similarly, the Application B 122 can maintain a source record 203 that includes the customer phone number. The source record 203 is identified by a source record identifier CRM1. Accordingly, the MDM system 131 maintains a link between the golden record ID GR1 and the each of the source record IDs, ERP1 and CRM1. The golden record 201 can include a super-set of information relative to the source records. For example, the golden record 201 can include a plurality of data fields wherein some of the data fields can be associated with one set of applications while other data fields can be associated with another set of applications. The act of standardizing or augmenting information contained in a golden record is referred to herein as enrichment.

The Atom Cloud 132 is configured to map fields at the golden record 201 to corresponding fields at applicable source applications. This mapping can include a string manipulation specification that the Atom Cloud 132 can perform as the Atom Cloud 132 transfers information between the golden record 201 and the source records 202 and 203. For example, the golden record 201 and the source record 202 can include a data field representing a nine digit Zip Code, while the source record 203 can include a data field representing a seven digit Zip Code. Accordingly, if the Atom Cloud 132 determines that the Zip Code stored at the MDM system 131 has changed, the Atom Cloud 132 is configured to truncate the four right-most digits from the Zip Code before presenting the information to the source application 122 for update. Similarly, the Atom cloud 132 can perform string manipulations on information as the information is forwarded from the source record 203 to the golden record 201.

Figure 3:
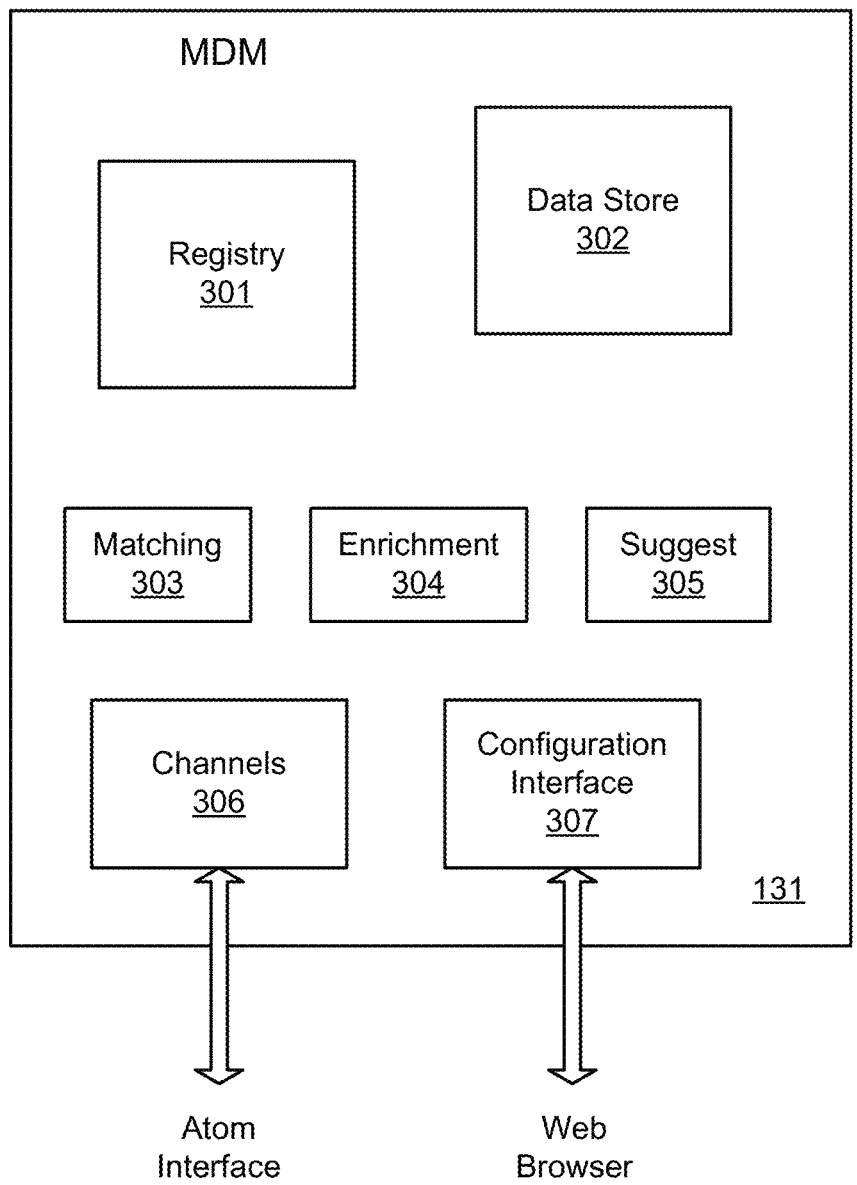
FIG. 3 is a block diagram illustrating the MDM system according to an embodiment of the present disclosure.

FIG. 3 shows the MDM system 131 of FIG. 1 according to another embodiment of the present disclosure. The MDM system 131 includes a registry 301, a data store 302, a matching unit 303, and enrichment unit 304, a suggest unit 305, channels 306, and a configuration interface unit 307. The registry 301 maintains links between each golden record managed by the MDM system 131 and one or more corresponding source records, each record having a respective identifier as described above. The registry 301 has the ability to enumerate new golden records, add and remove links to/from golden records, merge golden records into a single golden record, split a golden record into multiple golden records, and the like. In addition, the registry 301 is configured to maintain a record of the aforementioned events and allows access to the event history since a specified point in time. In an embodiment, the registry 301 provides a means to view a record, record IDs, and the value of links that associate golden record identifiers with source record identifiers.

The data store 302 is configured to store each of the golden records managed by the system. In one embodiment, the data store 302 is included at or proximately located near other portions of the MDM system 131. For example, the MDM system 131 can include one or more servers installed at an equipment rack and the data store 302 can include one or more disk drives immediately accessible to the server over a local interconnect. In another embodiment, the data store 302 can be located geographically remote from other portions of the MDM system 131. For example, portions of the data store 302 associated with a particular client can be located on-premise at a corresponding client enterprise, such as at the enterprise 110 of FIG. 1. Alternatively, the data store 302 associated with one or more clients can be provided at another enterprise that is remote from the MDM system 131, such as at one or more commercial enterprises that provide data storage and archival services. In an embodiment, the data store 302 can segregate records of one client from records of another client, while in another embodiment; records of disparate clients can be intermingled on a single logical device or group of devices. In an embodiment, the data store can provide versioning of golden records, where each version can be represented as the record's full XML tree or, alternatively, as an XML tree that only contains incremental changes with respect to a record's previous version. In another embodiment, the data store 302 can expose a way to discover record updates and acknowledge receipt of outstanding record updates. In still another embodiment, records or record attributes can be associated with a corresponding time stamp to identify when each version of the attribute or record was created or updated. The time stamps permit retrieval of a record as it appeared at a specified time.

An important aspect of the operation of the MDM system 131 is to prevent duplication of data within the system. For example, data associated with a new source application may include a customer name and address, while an existing golden record also may include a person by the same name, but having a different address. Accordingly, the MDM system 131 should determine whether the address at the existing golden record should be updated, or whether a new golden record should be created. Accordingly, the matching unit 303 is configured to evaluate incoming source records that are not yet linked to a corresponding golden record and to determine whether an existing golden record contains the information included in the source record. A match between a source record and a golden record need not be exact. For example, the matching unit 303 can determine that a customer Bill W. Smith included at an existing golden record is the same as a customer William Smith included at a source record.

In an embodiment, the matching unit can compare attributes of a new source record with attributes of existing golden records to identify whether one of the golden records corresponds with the new source record. For example, the matching unit 303 can determine that an electronic mail address included at the new source record matches an email address included at an existing golden record. The matching unit 303 operates based on one or predefined rules, which can include conditional expressions and corresponding logical operators. The rules can include logical expressions based on the value of attributes included at respective records. For example, a matching rule can compare a value of a string included at a new source record and representing a first name with a value of a string at an existing golden record and determine whether the values are identical. In another embodiment, the matching rules can include fuzzy compare operators operable to identify similarities between an attribute associated with a source record and an attribute associated with an existing golden record. In an embodiment, the suggest unit 305 can recommend matching rules to a user during initial configuration of the MDM system 131 by a user.

The enrichment unit 304 is configured to specify a standard or canonical form for a particular record, such as a golden record. For example, standard or proprietary formats and syntaxes may exist for storing data associated with a specific application, type of application, or type of information. These formats and syntaxes together define a data profile of a corresponding record. In an embodiment, the enrichment unit 304 can provide functions that can be executed to modify the value of one or more information fields as the information is incorporated into and retrieved from a golden record. For example, a standard format of a postal address included at a golden record may prescribe particular rules of capitalization and abbreviation, the number of digits included in a Zip Code, and the like. In an embodiment, third-party or on-line services can be accessed that provide standardized data. For example, a service organization can be accessed or hired to provide a standardized street address for a particular individual in response to being provided with a name of the individual. In another example, the service may provide missing information, for example a Zip Code. The enrichment unit 304 can be used to specify functions describing how to manipulate a value of a data field to conform to predefined best-practices. A function can specify operations such as truncation, concatenation, string or numerical manipulations, and the like. A function may be implemented using a scripting language, another programming language, or the like. In an embodiment, the suggest unit 305 can provide users with assistance during the initial configuration of the MDM system 131. For example, the suggest unit 305 can suggest new information fields that can be incorporated into a golden record, or can suggest a syntax for a value of a specific information field. In still another embodiment, the enrichment unit 304 can identify records having missing or incomplete data values. For example, the enrichment unit 304 can detect that a source record associated with a customer does not include an email address.

The suggest unit 305 is configured to help a user initially configure and administer the MDM system 131. The suggest unit 305 is configured to accumulate exemplary practices of many users/clients of the MDM system 131 and to provide guidance or recommendations to other users based on the stored information. The stored information can include data profiles of golden records associated with a particular source application, enrichment standards, mapping procedures, matching rules and algorithms, and the like. For example, a new user of the MDM system 131 may be tasked with defining a data profile of a golden record corresponding to a particular third-party ERM application, and the suggest unit 305 can provide the user with recommendations based on the experience of other users that manage data associated with that ERM application. Recommendations can be provided in the form of initial form templates, drop-down menus, dialog boxes, and the like.

Configuration of the MDM system by a user includes specifying data profiles of one or more golden records, identifying one or more source records associated with remote applications or services, identifying mapping information to define a relationship between attributes of a source record and a corresponding golden record, providing matching rules, enrichment information, Atom processes, and the like. In an embodiment, the suggest unit 305 can provide assistance to a user during each phase of the configuration process.

The suggest unit 305 can provide a template for a golden record based on a name or keyword provided by a user. For example, a user can specify that a particular golden record is associated with business contacts, a company's business organization, products, and the like. In response to a user specifying that a golden record is associated with a product, the suggest unit 305 can provide a golden record data profile that includes attributes identified by previous users of the MDM system 131 that generated golden records relating to products. Attributes associated with a golden record relating to products can include a name of the product, a description of the product, a product number, and the like. A template or recommendation provided by the suggest unit 305 can be modified by a user, if necessary. In addition to providing classification information of a desired golden record as described above, a user can request a golden record be generated in response to identifying a particular source record that they wish to have represented at the MDM system 131. For example, a user may identify a specific ERP record at a corresponding third-party service company. In response, the suggest unit 305 can provide a template of a golden record generated by one or more other users of the system 131 that corresponds to the identified source record. In an embodiment, the suggest unit 305 can provide multiple recommendations, each having a corresponding priority ranking. In an embodiment, the suggest unit 305 also can identify additional attributes based on attributes provided by a user. For example, the suggest unit 305 may identify that a user has included an attribute "street address" as a golden record under construction. The suggest unit 305 can alert a user that previous clients who included this attribute also included attributes corresponding to "country" and "Zip Code."

The suggest unit 305 can assist a new user in developing mapping rules based on the experience and practice of other users of the MDM system 131. For example, the suggest unit 305 can identify that a user wishes to map an ERP source record to a corresponding golden record and provide a template specifying the mapping of individual attributes between the source record and the golden record. In an embodiment, mapping suggestions can be provided based on the specific name of a service provider. In another embodiment, mapping suggestions can be provided based on the names of individual record attributes without knowing the specific name or affiliation of the source record, as would be necessary when providing mapping from a proprietary source record.

The suggest unit 305 can assist a user in specifying matching rules. The suggest unit 305 can evaluate the collection of attributes included at a golden record and any classification information provided by the user, and generate a template providing match rules identified by other users of the MDM system 131 that are associated with similar golden records. For example, the suggest unit 305 can recommend that matching rules first attempt to match a new source record to an existing golden record by comparing values associated with an e-mail attribute, followed by attributes associated with last-name, first-name, address, and the like.

In another embodiment, the suggest unit 305 can provide a user with validation rules based on validation policies implemented by other users of the MDM system 131. Validation rules can help describe how errors can be detected by the MDM system 131. For example, validation rules can identify the existence of probable duplicate golden records, and how MDM 131 can respond in such a situation. For example, the MDM system 131 can store information associated with a potential error at a manual resolution queue and notify a registered representative by email. The representative can log on to the MDM system 131 using an Internet browser to identify and resolve the error.

In still another embodiment, the suggest unit 305 can assist a user during the process of developing individual Atoms, such as Atoms of the Atom cloud 132. For example, the suggest unit 305 can provide an initial template to a user based on Atom processes generated by other users of the MDM system 131. The template can include communication protocols for querying corresponding source applications and MDM channels 306 to identify when respective records have been updated. Like other suggestions provided by the suggest unit 305, the template can be customized to reflect particular information already provided by the user during the configuration process. In another embodiment, Atom templates can be retrieved from a registered library of off-the-shelf Atom modules. The Atoms can be further customized as needed based on information provided by the suggest unit 305.

The channels 306 provide an interface between individual Atoms at the Atom Cloud 132 and the registry 301. Each source application at the remote enterprises 120 is uniquely associated with a corresponding channel at the channels 306. Each channel is configured to monitor the registry 301 to determine whether a golden record that is associated with a respective source record has been updated. If a channel determines that an associated golden record has been updated, the channel makes the updated information available for retrieval by the corresponding Atom. In an embodiment, the channel provides the updated golden record in its entirety. In another embodiment, the channel provides only the portion or portions of the golden record that have changed. Each Atom of the Atom Cloud 132 monitors a corresponding channel and forwards updated information to a corresponding source application if the channel indicates that an update to an associated golden record has occurred. In an embodiment, each channel of channels 306 can provide an interface to the registry 301 for updating a golden record at the registry 301 based on a request from a corresponding Atom of the Atom Cloud 132. The channels 306 can be referred to as harmonization channels because it is through the update information provided at the channels 306 that individual Atoms of the Atom Cloud 132 can update (harmonize) source records to be consistent with associated golden records.

The configuration interface 307 provides a graphical user interface (GUI) through which a user can configure operation of the MDM system 131 using an Internet web browser. The GUI can include menus, visual editors, symbolic dataflow diagrams, application wizards, scripting languages, and similar configuration tools that can be provided using a web browser. The GUI can be accessed using an Internet browser or by using another application providing communication using Internet protocols. In embodiment, the configuration interface 307 can provide an application programming interface (API) to support configuration or administration of the MDM system 131 using a software program. Configuration of the MDM system 131 includes identifying a collection of attributes that together form each golden record, herein referred to as a data profile of the record. Configuration also includes identifying source applications, enterprises, and associated channels, defining matching rules to be implemented by the matching unit 303, enrichment rules to be implemented by the enrichment unit 304, the location of a remote data store, if applicable, and similar information. During the configuration procedure, users can be provided with implementation and configuration suggestions based on information stored at the suggest unit 305. For example, the suggest unit 305 can provide an initial framework and provide additional guidance or recommendations to satisfy the specific needs of a user based on information stored at an information database. In an embodiment, the configuration interface 307 can provide an environment for defining the operation of the Atom 112 and individual Atoms of the Atom Cloud 132, described below with reference to FIGS. 6-8.

Figure 4:
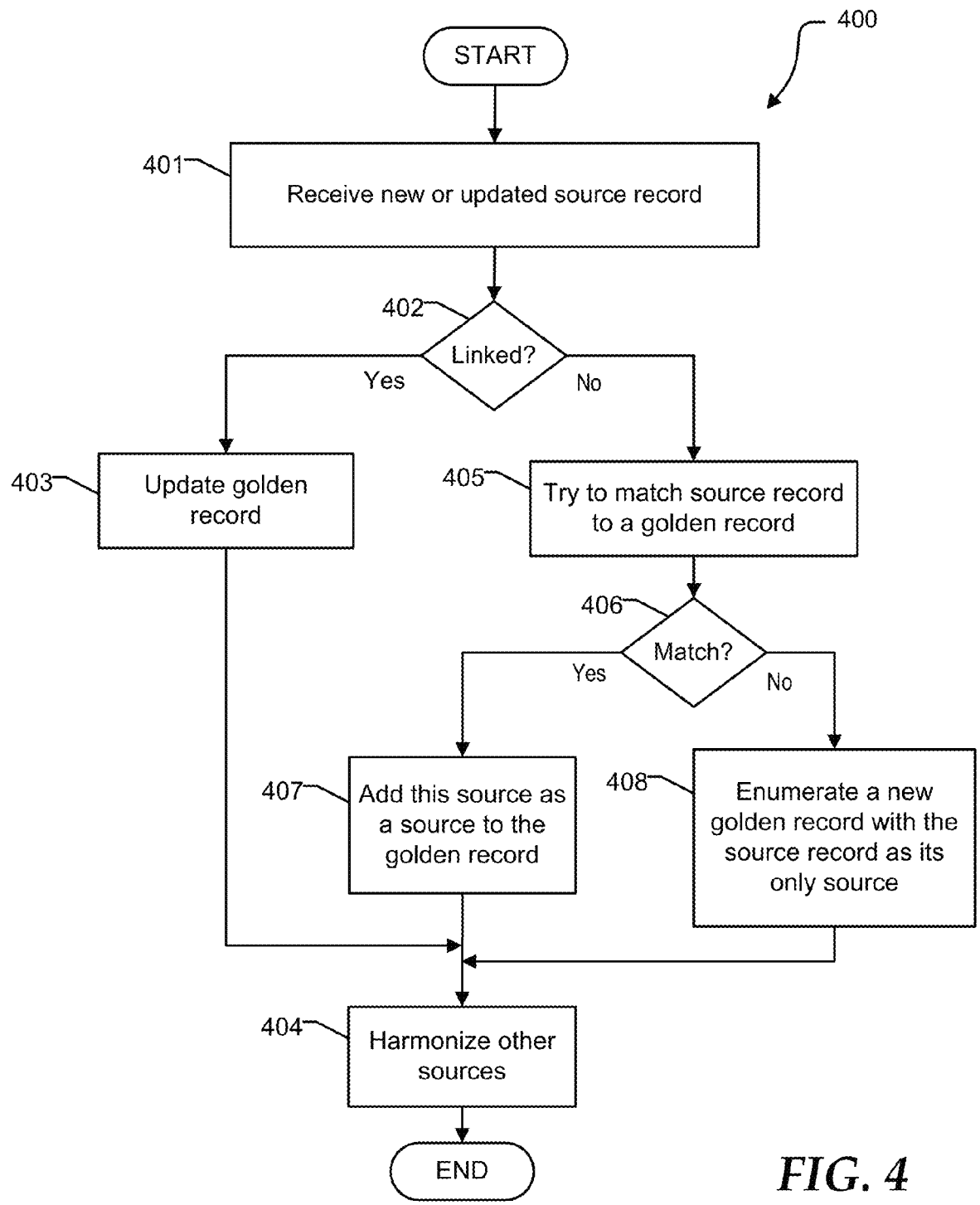
FIG. 4 is a flow diagram illustrating a method of operating the MDM system according to an embodiment of the present disclosure.

FIG. 4 shows a method 400 of operating the MDM system of FIG. 1 according to an embodiment of the present disclosure. The method 400 begins at block 401 where a new or updated source record is received an MDM system. For example, an Atom at the Atom cloud 132 can periodically determine whether a source record associated with an application at a remote enterprise has been modified. Alternatively, the a source record provided to the MDM system 131 may be a record that is not yet linked to a golden record maintained by the MDM system 131. The flow proceeds to the decision block 402 where it is determined whether the source record is presently linked to an existing golden record. If the incoming source record is linked to a golden record, the flow proceeds to block 403 where the corresponding golden record is updated to reflect the change identified in the source record.

The flow proceeds to block 404 where records all applicable sources are harmonized. Harmonization is a process through which source records that are linked to the updated golden record are updated so that the values of individual attributes are consistent between all the golden record and all source records that are linked to the golden record. For example, once a golden record has been updated, each channel of channels 306 that is associated with a source application that includes a source record linked to the updated golden record provides an indication of the updated golden record. An Atom of the Atom Cloud 132 corresponding to each channel periodically monitors its respective channel and becomes aware of the updated golden record. In response, each Atom transmits the change information to a respective source application, requesting that a corresponding source record be updated to reflect the new value at the golden record.

Each Atom of the Atom Cloud 132 is an autonomous interface process module that is substantially unaware of activities underway at other Atoms or at the MDM system 132. Instead, each Atom monitors an associated channel for indications of a change to a golden record, and monitors each source application to identify a change at a source record. If an Atom detects change information at a channel, the Atom provides the update to a corresponding source record, requesting that the source record be updated to reflect the new value at the golden record. If an Atom detects a change at a source record, the Atom provides the updated source information to the MDM system 131 so that the corresponding golden record can be updated. One skilled in the art will appreciate that the independent processes described above will generally come to equilibrium when the golden record and all linked source records contain consistent values. One skilled in the art also will understand that there are exception conditions that may arise that require remedial behavior, which is typically managed by the registry 301 and/or the data store 302.

Returning to decision block 402, if the source record received at block 401 is not yet linked to a golden record, the flow proceeds to block 405 where the MDM system 131 attempts to match the source record with an existing golden record. If a match is detected, the flow proceeds from decision block 406 to block 407 where the new source is linked to the corresponding golden record. The flow proceeds to block 404 where other source linked to the golden record are harmonized, as described above with reference to block 404. Returning to decision block 406, if the MDM system 131 fails to identify a golden record that matches the incoming new source record, the flow proceeds to block 408 where the MDM system 131 enumerates a new golden record with the associated source record as the only source. The flow proceeds to block 404 where the new golden record can be published via the channels 306.

Figure 5:
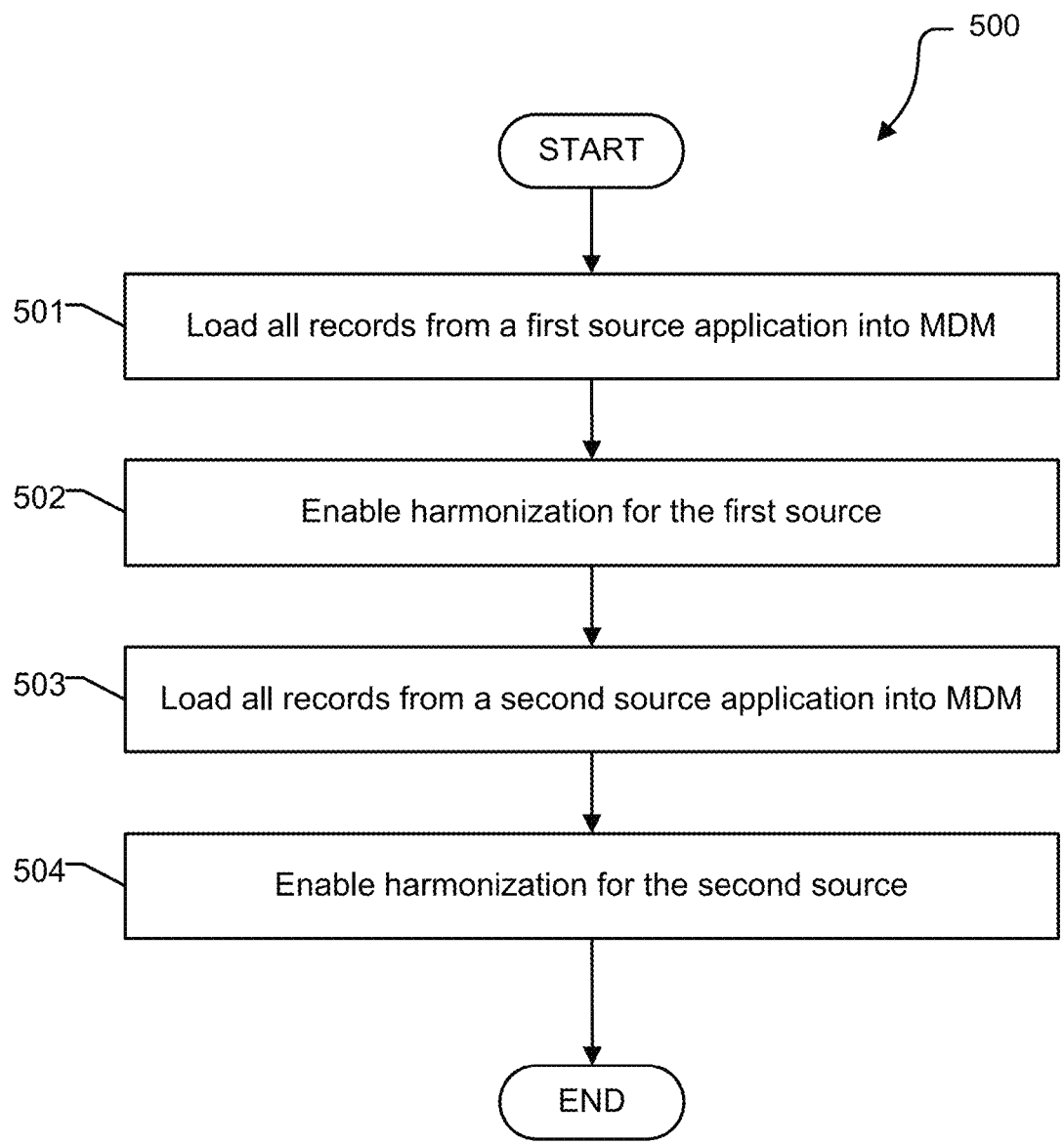
FIG. 5 is a flow diagram illustrating a method for initializing operation of the MDM system according to an embodiment of the present disclosure.

The harmonization process described above can be better understood with reference to FIG. 5 which shows a method for initializing operation of the MDM system 131 according to an embodiment of the present disclosure. In particular, the method illustrates the process of adding new sources to the MDM system 131 and associated harmonization procedures. The flow begins at block 501 all records from a first source application are loaded into the MDM system 131. At block 502, harmonization of the first source is enabled. At block 503, all records from a second source application are loaded into the MDM system 131. At block 504, harmonization of the second source is enabled.

Prior to receiving the source records from the first source application, there are no golden records present at the MDM system 131. As the MDM system 131 is bootstrapped, a collection of golden records is established. A collection of golden records associated with a particular user or client can be referred to as a golden record universe. Furthermore, a client may define multiple golden record universes, each associated with a different type of information. For example, one golden record universe may be associated with personnel records while another golden record universe may be associated with customer records, product records, and the like. Partitioning records into specific record universes can be beneficial so that matching expressions, enrichments policies, Atom processes, and other configuration parameters can be customized for a particular type of records. For clarity, the following example is described in the context of two source applications, an ERP application and a CRM application, each with corresponding records.

Because the golden record universe is initially empty and more than one source record is not allowed to link to a given golden record, the result is a golden record for each CRM record, with this CRM record being the golden record's only source link. From that point on the Atom (interface process module) that checks the CRM application for data updates can send updates to the golden record universe based on updates to the CRM dataset. Once the CRM records have been linked to new golden records, the harmonization channel for updates to CRM is enabled. The CRM application is currently the only source for the golden record universe and thus this operation does not result in any updates going back to the CRM harmonization channel.

Once all records from the CRM application are uploaded and harmonization is complete, all of the records from ERP application are uploaded to the MDM system 131. The harmonization channel associated with the ERP application is presently inactive, so no updates are sent back to the ERP application. The CRM harmonization channel, however, is active and the following updates are sent on it: An ERP record that matched to an existing golden record (existing golden records are those that got created during the CRM load into the MDM system 131) is sent to the CRM application as a record update. This assumes that the ERP application contributed a new or updated an existing field to the golden record. If the ERP record did not generate a change in the golden record data MDM simply records the ERP record as a link to the golden record and does not send any update on the CRM harmonization channel. The CRM update may cause a change at the CRM application that is picked up by the Atom which listens for CRM changes. The Atom proceeds to communicate the change back to the MDM system 131. Unless the CRM record is enriched, this MDM update does not cause any change to the golden record and as such is "ignored".

An ERP record that did not match an existing golden record results in creation of a new golden record which propagates on the CRM harmonization channel and a new record is created in the CRM application. The creation of a new record in the CRM application is identified by the Atom responsible for monitoring the CRM application, which propagates the change back to the MDM system 131. Next, the harmonization channel for providing updates to the ERP application is activated. Unlike the de-generate case of turning the channel on for CRM updates, de-generate as CRM was the only contributing source to the golden record universe at the time the CRM channel was activated, activating the ERP channel now generates channel updates. The act of turning the channel on results in the application examining the current state of each record in the golden record universe and acting accordingly. When this happens a golden record can be in one of the following three states, denoted as bronze, silver, and gold. A bronze record is a record that is linked-to only by a ERP link. In this case no update needs to be generated on the ERP channel that is being bootstrapped.

A silver record is a record that is linked to only by a CRM link. In this case a create request is placed on the ERP harmonization channel. The act of generating the create request is smart enough to determine whether or not a create event for this golden record has already been placed on the channel, in which case no duplicate create is generated. The latter can happen if a new CRM record gets enumerated as a golden record or an existing CRM-only golden record received an update from CRM after the channel was turned on and before channel bootstrap logic got to this particular golden record. A golden record is a record that is linked to by both ERP and CRM. In this case an update gets sent on the ERP harmonization channel. Note that the update to the CRM record (if one was necessary) has already been generated by the act of matching the ERP entity to the golden record that had the CRM link. The update on the ERP harmonization channel gets generated only if a special initial-match marker still exists for the ERP record and this golden record. This marker is necessary to avoid sending duplicate updates during a channel bootstrap and is honored both by the channel bootstrap logic as well as the normal update processing logic. The need for this marker is demanded by the fact that an update to the golden record can arrive and stick after the channel gets turned on but before the bootstrap logic gets to this golden record.

Bringing a new source into an existing golden record universe is no different than integrating the second, third, fourth, etc. source in the cold bootstrap sequence described above. The sequence for integrating a new source into an existing golden record universe consists of all the steps that involve the ERP data in the discussion above.

In an embodiment, the Atom interface process modules, such as the Atom 112 and each Atom of the Atom Cloud 132 can be generated using an Internet-based application program and a web browser. This application program is described below with reference to FIGS. 6-8.

Figure 6:
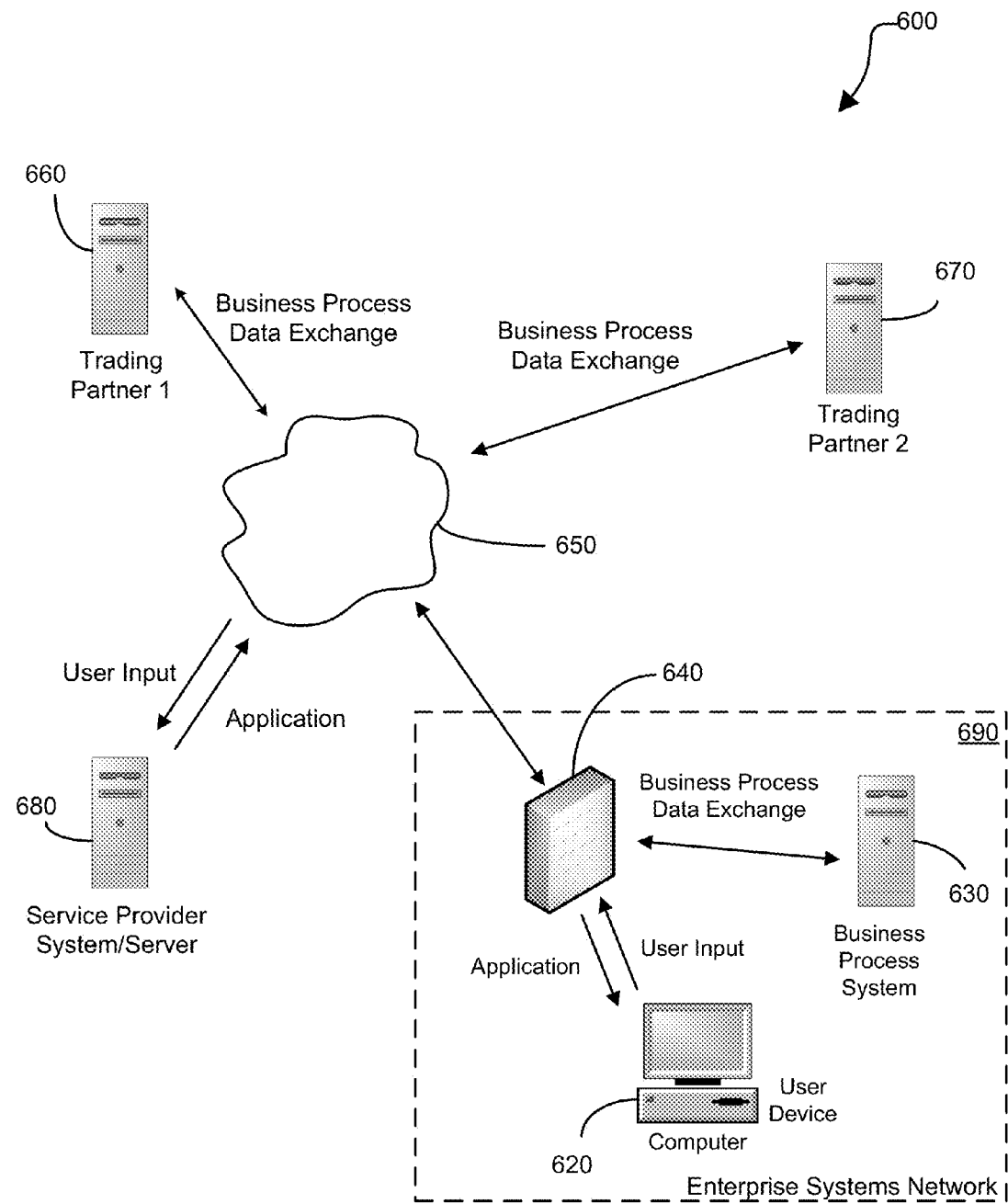
FIG. 6 is a block diagram illustrating a distributed business network system according to an embodiment of the present disclosure.

FIG. 6 shows a distributed business network system 600 including conventional information handling systems of a type typically found in client/server computing environments. More specifically, the system 600 includes a conventional user/client device 620, such as a desktop personal computer, enabling a user to communicate via a communications network 650, such as the Internet. The exemplary user device 620 may be configured with conventional web browser software. The web browser, such as Microsoft Corporation's Internet Explorer web browser software, allows the user to interact with websites via the network 650. The client device 620 is positioned within an enterprise network 690 behind an enterprise network's firewall 640. For illustrative purposes, the enterprise network 690 includes a business process system 630, which may include conventional computer hardware and commercially available applications and services such as ERP, CRM, and the like. The system 600 further includes trading partner systems 660 and 670 for receiving and/or transmitting data relating to business-to-business transactions. For example, a retailer may operate trading partner system 660 to allow for issuance of purchase orders to suppliers and to receive invoices from suppliers in electronic data form as part of electronic data exchange processes of a type well known in the art.

The system and methods disclosed herein allow an enterprise to obtain the capabilities needed to conduct the electronic exchange of data with one or more trading partners, internal applications, or applications available via the Internet, commonly referred to as Software as a Service. The present disclosure provides these capabilities in a unique fashion by providing the enterprise with a software application including the configuration information required for conducting the integration process, and also the executable code needed to make the process run, and specially configuring this application to run within the enterprise's network, for example, behind the firewall of the enterprise or within a third-party-hosted data center, etc., that is considered to be part of the enterprise's network so that it may connect to various software applications running internal to the enterprise's network.

In accordance with the present disclosure, a provider of a service (service provider) operates a service provider server/system 680 within the system 600. The system 680 may be specially configured in accordance with the present disclosure, and may be capable of communicating with devices in the enterprise's network 690. It should be noted that the communication between system 680 and network 690 can be essentially unidirectional in that communications/communication sessions originate from network 690 to system 680, and not from system 680 to network 690. Accordingly, the network 690 need not have its firewall 640 modified to allow incoming traffic from communications sessions originating from system 680. In an embodiment, the service provider, and system 680 in particular, can provide on-demand, real-time creation of customized software application. For example, the system 680 can be used to generate the Atoms 112 and 132 and configure the MDM system 131 of FIG. 1. In another embodiment, the system 680 can serve as a host for execution of the Atoms and/or MDM processes. In an embodiment, the tools and services provided by the server/system 680 can be provided via the configuration interface 307 of FIG. 3.

The system 680 may be configured in accordance with the present disclosure to provide web server functionality for presenting a user-accessible website. Communications between the user device 620 and the system 680 website may be performed using conventional communications technologies, such as the HTTPS protocol. The website may be specially configured to provide a graphical user interface providing a visual designer environment permitting a user to define process flows between applications/systems, such as between trading partner and enterprise systems, to model a customized business integration process. The graphical user interface may be used by different enterprises/customers of the service provider.

Figure 7:
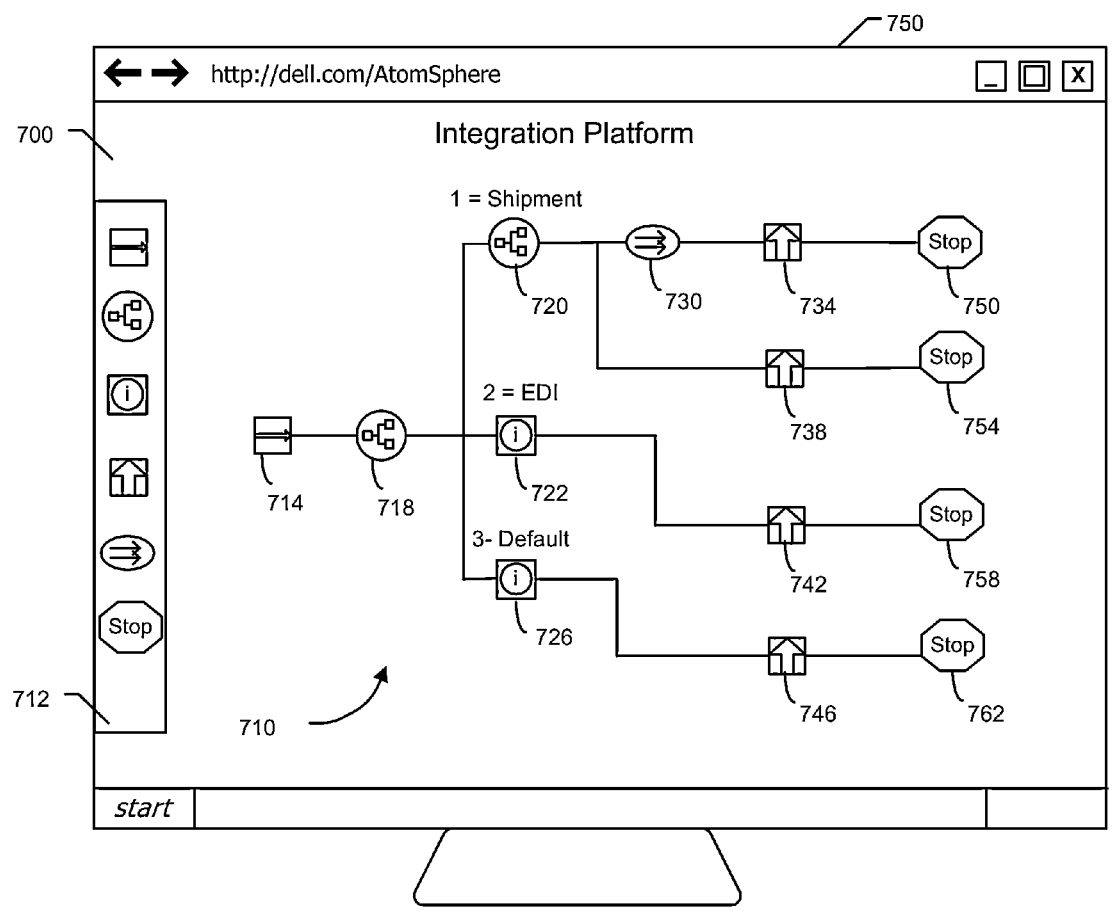
FIG. 7 illustrates a graphical user interface for developing a system integration application program according to an embodiment of the present disclosure.
Figure 8:
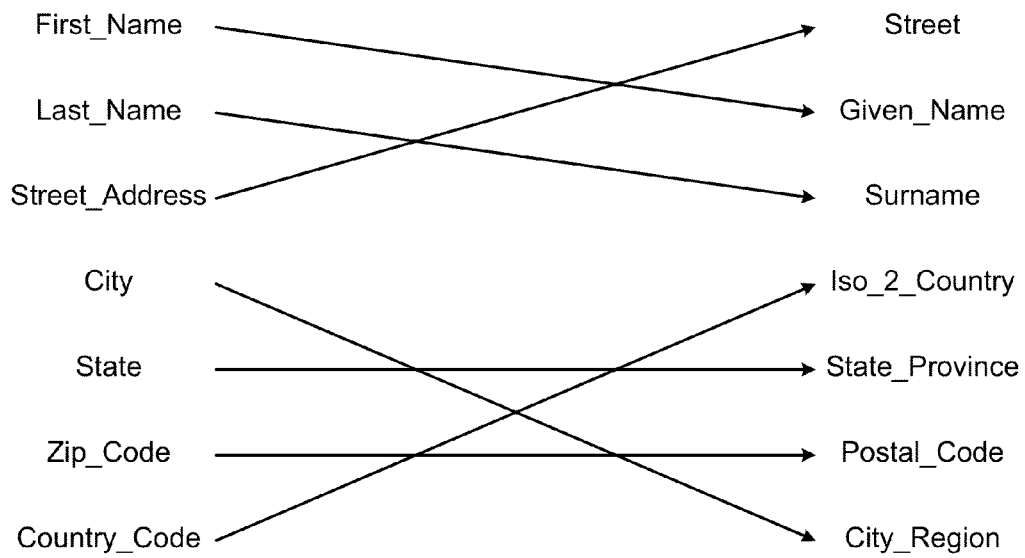
FIG. 8 is a block diagram illustrating a data map according to an embodiment of the present disclosure.

FIGS. 7 and 8 illustrate a system for automating development of customized system integration application programs, such as the Atoms 112 and 132. A web-based graphical user interface (GUI) provided by the system 680 allows a user to visually model a business process via a flowcharting process. During this modeling process the user selects from a predetermined set of process-representing visual elements. The graphical interface can be used to define and generate a wide range of system integration and process flows. For example, a process flow can enable bi-directional exchange of data between internal applications, between internal applications and external trading partners, or between internal applications and applications running external to the enterprise. Applications running external to the enterprise are commonly referred to as Software as a Service (SaaS). Each integration process represents a complete end-to-end interface. For example, a process could be modeled to accept a purchase order (PO) from a retailer, transform the PO into a format recognizable by a certain internal order management software application of the enterprise, and then insert the contents of that PO directly into the enterprise's order management system.

FIG. 7 shows a web-based GUI 700 in accordance with a specific embodiment of the present disclosure. The GUI can be provided by the system 680 and can be used to define an integration flowchart. After the integration flowchart is created, including corresponding configuration parameters, the system 680 can generate custom software to provide the desired interoperability as defined by the user-generated integration flowchart. The custom software is a dynamic runtime engine and includes an executable software application capable of running on a computer within the enterprise's network, which may include, for example, networks owned and/or operated by third party data center providers. When started by a user, the executable software application connects to the system 680 and downloads an XML representation of the visual model representing the integration process, and all requisite code needed to run the integration process. The required code includes a generic application template, selected predefined code sets that are selected as a function of the user's needs as defined by the modeled process, and a data code set that includes input provided by the user for customizing the stock components for a specific integration process. Additional components may be retrieved as required. As changes are made to this model, via the website, or to the code that executes the model, the executable software application will automatically check for and apply these changes as needed without requiring human intervention.

The GUI 700 provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the service provider system 680.

The GUI 700 allows the user to provide information relating to trading partners, activities, enterprise applications, enterprise system attributes, and/or process attributes that are unique to the end-to-end business integration process of a specific enterprise. For example, the graphical user interface may provide drop down or other user-selectable menu options for identifying trading partners, application connector and process attributes/parameters/settings, etc., and dialog boxes permitting textual entries by the user, such as to describe the format and layout of a particular data set to be sent or received, for example a Purchase Order.

By way of illustrative example, the website interface may provide a visual menu of elements in a drag-and-drop environment permitting the user to create a visual model of business process activities desired to be handled by the customized software application. For example, this may involve a user's identification of receipt of purchase orders as an activity, or of issuance of invoices as an activity. By way of illustrative example, FIG. 7 shows a GUI 700 of an integration platform displayed within a web browser window 750. The exemplary GUI 700 displays an exemplary business process integration model 710 in the form of a flow diagram modeling a shipment order business process. The visual model may be created by a user within the visual designer environment, via the website interface provided by the system 80.

The exemplary flow diagram of FIG. 3 includes an inbound connector element 714, routing process elements 718 and 720, document Property elements 722 and 726, data transformation process element 730, outbound connector elements 734, 738, 742, and 746, and process end elements 750, 754, 758 and 762. Various ones of these elements are selected from a menu 712 of elements and arranged by the user relative to one another as appropriate to model a corresponding business process. The elements may require data input from a user. For example, the inbound connector element 714 selected from the menu by the user may be configured by the user for a specific enterprise and process by the user's selection of the element and completing dialog boxes, selecting menu items, etc. as appropriate. For example, the user may provide as input for configuring data entry element 714 that the data will be inbound from an information handling system at a remote enterprise. This may be performed via a data entry field displayed in the window upon selection of data entry element 714. The element, in combination with any required data input, may be associated with a specific Connector code set stored in the memory of the system 680.

The outbound connector elements may be similarly configurable. For example, the last step of the integration process may involve sending shipping order data to an information handling system at another remote enterprise. The Shipping Order will be prepared as an XML message, which is a readily recognizable format. The XML message is then sent to the outbound connector, and the outbound connector converts the XML message from this simple, recognizable format into the proprietary format that is understood by the SAP system. This conversion, and the need for it, is transparent to the user configuring the integration process. By way of further example, the routing element may require input for routing logic to be applied; the Document Properties element may require input for file naming, file storage location, etc. to be applied. There may be other elements as appropriate or necessary for modeling business processes, as desired.

Each branch of the flow diagram represents an end-to-end business process to be integrated. In the example of FIG. 7, the first (top-most) branch may model a process involving receipt of data from the remote enterprise system in a corresponding format, routing the data according to prescribed logic (for example, 1=shipment), further routing according to further logic, transforming the data from the remote enterprise system format to the destination system format by Data Transformation process element 330 to create an appropriately formatted XML document, and then transmitting the transformed data to the destination system in accordance with the properties and attributes of the outbound application connector 734. Examples of other common activities include synchronizing customer data between applications, synchronizing product information between applications, notification of receipt of goods ordered by a retailer, receipt of a work related injury claim, and many others.

Documents that are read into or sent out of a business process, such as the business process of FIG. 7, are each associated with a data profile. A data profile associated with a document, or with an application as a whole, includes the names of data fields included in the document. The data profile also can describe the layout or format of respective documents. For example, a data profile can include delimiters or column positions, data types, minimum/maximum string lengths, and the like. Profiles are most notably used in association with data maps. Data maps describe how information can be transferred from one document to another. For example, to transfer information included at an XML document to a flat file, the format of each document can be encoded using a respective data profile. Additionally, an application can use a data profile to inspect a corresponding document. Accordingly, a data maps include a source data profile, a destination data profile, and mapping information indicating a correspondence between each fields of the source data profile and a respective field of the destination data profile.

FIG. 8 shows a data map 800 according to an embodiment of the present disclosure. The data map 800 includes data fields 810 included at a first software application, labeled Application A, and data fields 820 included at a second software application, labeled Application B. Each data field represents a variable that can be associated with a value. For example, the data fields 810 include variables First_Name, Last_Name, Stree_Address, City, State, Zip_Code, and Country_Code. The data fields 820 include Street, Given_Name, Surname, Iso_2_Country, State_Province, Postal_Code, and City_Region. In an embodiment, a user of the business process integration platform graphical user interface 800 can manually generate a data map.

In an embodiment of the present disclosure, a user may drag and drop individual fields associated with a source data profile to a corresponding field of a destination data profile, as indicated by the arrows of FIG. 8. For example, the variable First_Name of Application A has been mapped to the variable Given_Name of Application B. The service provider 680 of FIG. 6 may use the data map 800 to generate and configure a system integration application program that will implement a customer's business process, such as the business process integration model 710 of FIG. 7. In another embodiment, the generation of a data map may be partially or fully automated based on information stored at a mapping database.

Figure 9:
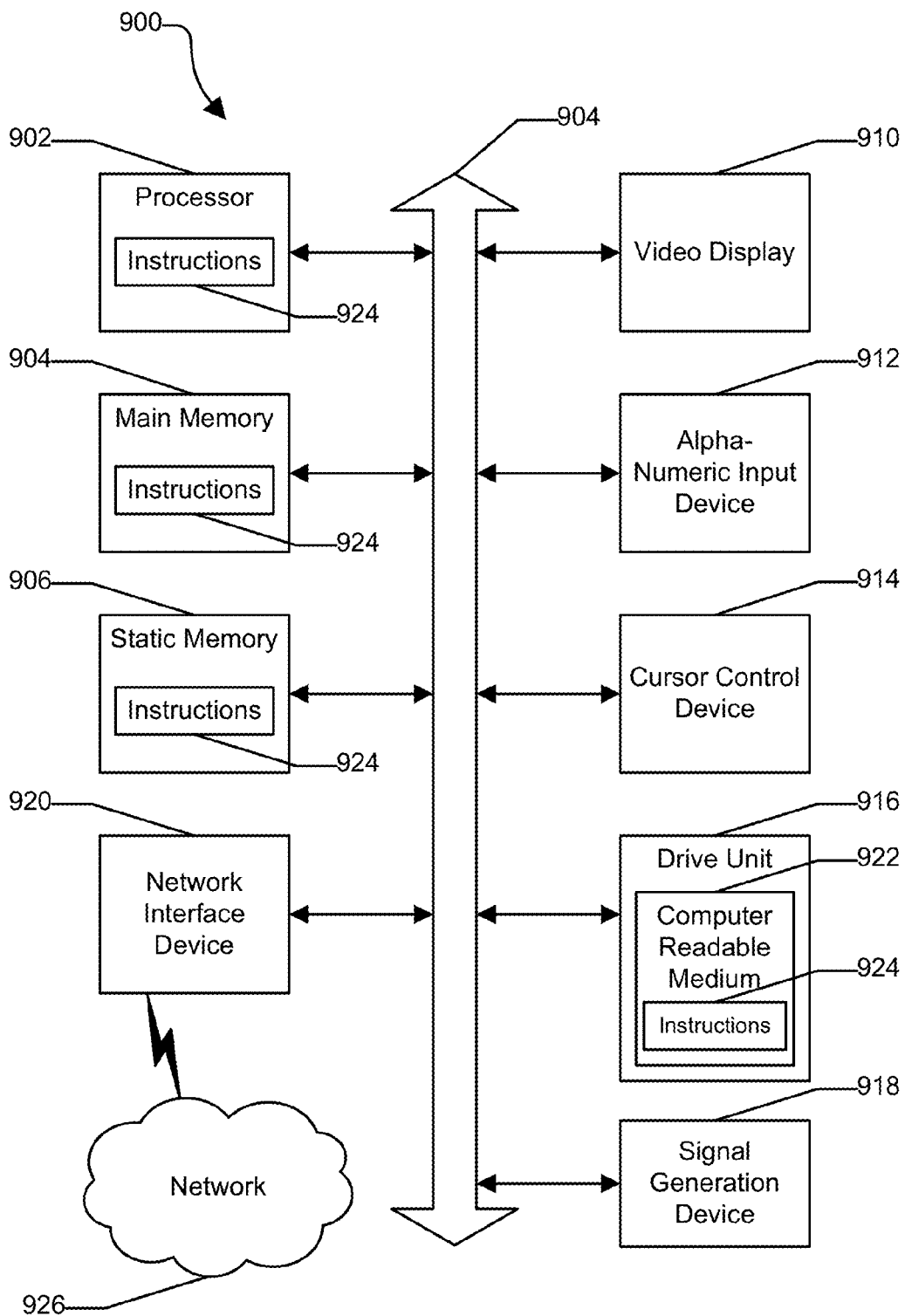
FIG. 9 is a block diagram of an information handling system according to an embodiment of the present disclosure.

FIG. 9 shows an information handling system 900 capable of administering each of the specific embodiments of the present disclosure. The information handling system 900 can represent the user device 620, the systems 630, 660, 670, and 680 of FIG. 6, or data processing devices associated with the system 100. The information handling system 900 may include a processor 902 such as a central processing unit (CPU), a graphics processing unit (GPU), or both. Moreover, the information handling system 900 can include a main memory 904 and a static memory 906 that can communicate with each other via a bus 908. As shown, the information handling system 900 may further include a video display unit 910, such as a liquid crystal display (LCD), an organic light emitting diode (OLED), a flat panel display, a solid state display, or a cathode ray tube (CRT). Additionally, the information handling system 900 may include an input device 912, such as a keyboard, and a cursor control device 914, such as a mouse. The information handling system 900 can also include a disk drive unit 916, a signal generation device 918, such as a speaker or remote control, and a network interface device 920. The information handling system 900 can represent a server device whose resources can be shared by multiple client devices, or it can represent an individual client device, such as a desktop personal computer.

The information handling system 900 can include a set of instructions that can be executed to cause the computer system to perform any one or more of the methods or computer based functions disclosed herein. The computer system 900 may operate as a standalone device or may be connected such as using a network, to other computer systems or peripheral devices.

In a networked deployment, the information handling system 900 may operate in the capacity of a server or as a client user computer in a server-client user network environment, or as a peer computer system in a peer-to-peer (or distributed) network environment. The information handling system 900 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single information handling system 900 is illustrated, the term "system" shall also be taken to include any collection of systems or sub-systems that individually or jointly execute a set, or multiple sets, of instructions to perform one or more computer functions.

The disk drive unit 916 may include a computer-readable medium 922 in which one or more sets of instructions 924 such as software can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the information handling system 900. The main memory 904 and the processor 902 also may include computer-readable media. The network interface device 920 can provide connectivity to a network 926, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal; so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
a memory to provide a data store;
a data registry configured and administered by a multi-tenant host enterprise for use by a plurality of client enterprises including a first client enterprise and a second client enterprise that independently subscribe to the host enterprise for data management services, the first and second client enterprises being unrelated and distinct businesses, the data registry to provide storage at the data store of a first data record associated with the first client enterprise and with a first source record and a second source record, the first and second source records provided by respective service providers contracted by the first client enterprise to provide business services, the data registry further to:
  maintain a first link identifying a relationship between the first data record and the first source record; and
  maintain a second link identifying a relationship between the first data record and the second source record;
an interface cloud including individual interface process modules executed by one or more hardware processors and defined by a corresponding one of the plurality of client enterprises and implemented by the host enterprise, the interface cloud including:
  a first interface process module to identify a value at the first data record has been updated and to provide the updated value to the first source record using an Internet protocol; and
  a second interface process module to identify a value at the second data record has been updated and to provide the updated value to the second source record using the Internet protocol, wherein operations performed by the first and second interface process modules are defined by the first client enterprise;
a suggestion database including configuration information associated with a plurality of users of the system; and
a configuration module executed by the one or more hardware processors to:
  provide Internet access to the system to facilitate configuration of the system by a first user at the first client enterprise; and
  provide configuration guidance to the first user based on the configuration information.

2. A method for establishing a multi-tenant master data management system, the method comprising:
storing a first record associated with a first client enterprise at a data store maintained by a multi-tenant host enterprise, the host enterprise providing data management services to multiple client enterprises including the first client enterprise and a second client enterprise that independently subscribe to the host enterprise for the data management services, the first and second client enterprises being unrelated and distinct businesses;
maintaining, at a data registry at the host enterprise, a first link identifying a relationship between the first data record and a first source record, the first source record associated with a first source enterprise located remotely from the host enterprise;
maintaining at the data registry a second link identifying a relationship between the first data record and a second source record, the second source record associated with a second source enterprise located remotely from the host enterprise and remotely from the first source enterprise, wherein the first and second source records are provided by respective service providers contracted by the first client enterprise to provide business services;
determining at a first interface process module at an interface cloud that a value at the first data record has been updated, and in response to the determining, providing the updated value to the first source enterprise using an Internet protocol, the interface cloud including individual interface process modules defined by a corresponding one of the multiple client enterprises and implemented by the host enterprise;
determining at a second interface process module at the interface cloud that a value at the second data record has been updated, and in response to the determining, providing the updated value to the second source enterprise using the Internet protocol, wherein operations performed by the first and second interface process modules are defined by the first client enterprise;
maintaining, at a suggestion database at the host enterprise, configuration information associated with a plurality of users of the multi-tenant master data management system;
providing Internet access to facilitate configuration of the multi-tenant master data management system by a first user at the first client enterprise; and
providing a configuration recommendation to the first user based on the configuration information.

3. An information handling system comprising:
a memory; and
computer-readable instructions stored in the memory and executable by a microprocessor to:
store a first record associated with a first client enterprise at a data store maintained by a multi-tenant host enterprise, the host enterprise providing data management services to multiple client enterprises including the first client enterprise and a second client enterprise that independently subscribe to the host enterprise for the data management services, the first and second client enterprises being unrelated and distinct businesses;

maintain, at a data registry at the host enterprise, a first link identifying a relationship between the first data record and a first source record, the first source record associated with a first source enterprise located remotely from the host enterprise;

maintain at the data registry a second link identifying a relationship between the first data record and a second source record, the second source record associated with a second source enterprise located remotely from the host enterprise and remotely from the first source enterprise, wherein the first and second source records are provided by respective service providers contracted by the first client enterprise to provide business services;

determine at a first interface process module at an interface cloud that a value at the first data record has been updated, and in response to the determining, provide the updated value to the first source enterprise using an Internet protocol, the interface cloud including individual interface process modules defined by a corresponding one of the multiple client enterprises and implemented by the host enterprise;

determine at a second interface process module at the interface cloud that a value at the second data record has been updated, and in response to the determining, provide the updated value to the second source enterprise using the Internet protocol, wherein operations performed by the first and second interface process modules are defined by the first client enterprise;

maintain, at a suggestion database at the host enterprise, configuration information associated with a plurality of users of the multi-tenant master data management system;

provide Internet access to facilitate configuration of the multi-tenant master data management system by a first user at the first client enterprise; and provide a configuration recommendation to the first user based on the configuration information.

4. The system of claim 1 wherein the configuration information includes a plurality of data profiles, each data profile of the plurality of data profiles associated with a corresponding data record and enumerating one or more attributes.

5. The system of claim 4 wherein providing configuration guidance comprises providing a first data profile based on an identity of a source enterprise associated with a third source record.

6. The system of claim 4 wherein providing configuration guidance comprises providing a first data profile based on classification information provided by the first user, the classification information characterizing a type of information stored at a third source record.

7. The system of claim 1 wherein providing configuration guidance comprises providing a template including initial configuration parameters selected from the information database based on a menu item selected by the first user at a graphical user interface.

8. The system of claim 1 wherein the configuration information includes mapping information to identify a relationship between an attribute at a second data record stored at the data store and an attribute of a third source record.

9. The system of claim 1 wherein the configuration information includes a mapping function specifying a data manipulation to be performed on a value of an attribute included at the first source record prior to updating a corresponding attribute at the first data record.

10. The system of claim 1 wherein providing the updated value to the first source enterprise comprises updating an attribute at the first source record, the attribute having a name different than a name of a corresponding attribute at the first data record.

11. The system of claim 1 wherein the configuration information includes enrichment information identifying an additional attribute to be included at the first data record based on attributes currently included at the first data record.

12. The system of claim 1 further comprising a matching unit to determine an association between a third source record and the first data record based on a logical expression including a value of a field at the third source record and a value of a field at the first data record.

13. The system of claim 1 wherein the data registry, the interface process module, and the configuration module are located at the host enterprise, and the first source enterprise and the second source enterprise are located remotely from the host enterprise.

14. The system of claim 13 wherein the data store is located remotely from the host enterprise.

15. A method for establishing a multi-tenant master data management system, the method comprising:
storing a first record associated with a first client enterprise at a data store maintained by a multi-tenant host enterprise, the host enterprise providing data management services to multiple client enterprises including the first client enterprise and a second client enterprise that independently subscribe to the host enterprise for the data management services, the first and second client enterprises being unrelated and distinct businesses;

maintaining, at a data registry at the host enterprise, a first link identifying a relationship between the first data record and a first source record, the first source record associated with a first source enterprise located remotely from the host enterprise;

maintaining at the data registry a second link identifying a relationship between the first data record and a second source record, the second source record associated with a second source enterprise located remotely from the host enterprise and remotely from the first source enterprise, wherein the first and second source records are provided by respective service providers contracted by the first client enterprise to provide business services;

determining at an interface process module at an interface cloud that a value at the first data record has been updated, and in response to the determining, providing the updated value to the first source enterprise using an Internet protocol, the interface cloud including individual interface process modules defined by a corresponding one of the multiple client enterprises and implemented by the host enterprise;

maintaining, at a suggestion database at the host enterprise, configuration information associated with a plurality of users of the multi-tenant master data management system;

providing Internet access to facilitate configuration of the multi-tenant master data management system by a first user at the first client enterprise; and providing a configuration recommendation to the first user based on the configuration information.

16. The method of claim 15 wherein the configuration information includes a plurality of data profiles, each data profile of the plurality of data profiles associated with a corresponding data record and enumerating one or more attributes.

17. The method of claim 15 wherein the configuration information includes a matching rule configured to identify whether a third source record received at the registry is associated with the first data record.

18. An information handling system comprising:
a memory; and
computer-readable instructions stored in the memory and executable by a microprocessor to:
store a first record associated with a first client enterprise at a data store maintained by a multi-tenant host enterprise, the host enterprise providing data management services to multiple client enterprises including the first client enterprise and a second client enterprise that independently subscribe to the host enterprise for the data management services, the first and second client enterprises being unrelated and distinct businesses;
maintain, at a data registry at the host enterprise, a first link identifying a relationship between the first data record and a first source record, the first source record associated with a first source enterprise located remotely from the host enterprise;
maintain at the data registry a second link identifying a relationship between the first data record and a second source record, the second source record associated with a second source enterprise located remotely from the host enterprise and remotely from the first source enterprise, wherein the first and second source records are provided by respective service providers contracted by the first client enterprise to provide business services;
determine at an interface process module at an interface cloud that a value at the first data record has been updated, and in response to the determining, providing the updated value to the first source enterprise using an Internet protocol, the interface cloud including individual interface process modules defined by a corresponding one of the multiple client enterprises and implemented by the host enterprise;
maintain, at a suggestion database at the host enterprise, configuration information associated with a plurality of users of the multi-tenant master data management system;
provide Internet access to facilitate configuration of the multi-tenant master data management system by a first user at the first client enterprise; and
provide a configuration recommendation to the first user based on the configuration information.

19. The method of claim 16 wherein providing a configuration recommendation comprises providing a first data profile based on an identity of a source enterprise associated with a third source record.

20. The method of claim 16 wherein providing a configuration recommendation comprises providing a first data profile based on classification information provided by the first user, the classification information characterizing a type of information stored at a third source record.

* * * * *